United States Patent
Ueno et al.

(10) Patent No.: US 6,798,625 B1
(45) Date of Patent: Sep. 28, 2004

(54) SPIN-VALVE MAGNETORESISTANCE SENSOR AND THIN-FILM MAGNETIC HEAD

(75) Inventors: Masaki Ueno, Osaka (JP); Kiyotaka Tabuchi, Hyogo (JP); Tatsuo Sawasaki, Nagano (JP); Hiroshi Nishida, Osaka (JP); Kazuhiro Mizukami, Osaka (JP); Fuminori Hikami, Osaka (JP)

(73) Assignee: Western Digital (Fremont), Inc., Fremont, CA (US)

( * ) Notice: Subject to any disclaimer, the term of this patent is extended or adjusted under 35 U.S.C. 154(b) by 311 days.

(21) Appl. No.: 09/670,309

(22) Filed: Sep. 26, 2000

(30) Foreign Application Priority Data

Oct. 28, 1999 (JP) .......................................... 11-307554

(51) Int. Cl.$^7$ ................................................ G11B 5/39
(52) U.S. Cl. ................................ 360/324.12; 360/324.1
(58) Field of Search .............................. 360/317, 324.1, 360/324.12, 324.11, 126

(56) References Cited

U.S. PATENT DOCUMENTS

| | | | | |
|---|---|---|---|---|
| 5,027,246 A | * | 6/1991 | Numazawa et al. | 360/126 |
| 5,422,571 A | * | 6/1995 | Gurney et al. | 324/252 |
| 5,436,781 A | * | 7/1995 | Matono et al. | 360/126 |
| 5,462,823 A | * | 10/1995 | Evans et al. | 360/131 |
| 5,528,440 A | * | 6/1996 | Fontana et al. | 360/113 |
| 5,580,667 A | * | 12/1996 | Lal et al. | 428/610 |
| 5,608,593 A | * | 3/1997 | Kim et al. | 360/113 |
| 5,708,358 A | * | 1/1998 | Ravipati | |
| 5,871,622 A | * | 2/1999 | Pinarbasi | 204/192.11 |
| 6,061,210 A | * | 5/2000 | Gill | 360/113 |
| 6,074,743 A | * | 6/2000 | Araki et al. | 324/207.21 |
| 6,198,610 B1 | * | 3/2001 | Kawawake et al. | 360/324.12 |
| 6,201,673 B1 | * | 3/2001 | Rottmayer et al. | 360/324.12 |
| 6,208,491 B1 | * | 3/2001 | Pinarbasi | 360/324.1 |
| 6,271,997 B1 | * | 8/2001 | Gill | 360/314 |
| 6,278,592 B1 | * | 8/2001 | Xue et al. | 360/324.12 |
| 6,313,973 B1 | * | 11/2001 | Fuke et al. | 360/324.1 |
| 6,338,899 B1 | * | 1/2002 | Fukuzawa et al. | 428/332 |
| 6,348,274 B1 | * | 2/2002 | Kamiguchi et al. | 428/692 |
| 6,456,468 B1 | * | 9/2002 | Hayashi | 360/324.1 |
| 6,646,835 B2 | * | 11/2003 | Saito et al. | 360/324.11 |

FOREIGN PATENT DOCUMENTS

| | | |
|---|---|---|
| EP | 0 611 033 A2 | 1/1994 |
| JP | 2744883 | 4/1998 |
| WO | WO 94/11889 | 11/1993 |

OTHER PUBLICATIONS

1999 IEEE International Magnetics Conference Digest of Technical Papers, Giant Magnetoresistive (GMR) Sensor Microelectromechanical System (MEMS) Device, Dr. Rajeshuni Ramesham, Ph.D., Apr. 1999, vol. 5 No. 1.

* cited by examiner

Primary Examiner—Jefferson Evans
(74) Attorney, Agent, or Firm—Burgess & Bereznak, LLP

(57) ABSTRACT

The present invention provides a spin-valve magnetoresistance sensor in which are formed, on top of the substrate, free layers, and pinned layers, enclosing a nonmagnetic spacer layer, and an antiferromagnetic layer adjacent to the pinned layers. The sensor is also equipped with a back layer including at least two nonmagnetic metal layers adjacent to the free layers on the side of the free layers opposite the nonmagnetic spacer layer. The back layer has at least one nonmagnetic metal layer of Cu with high electrical conductivity, preferably formed adjacent to the free layers, as for example in a two-layer structure of Cu and Ru or a three-layer structure Ru/Cu/Ru. In addition to a high read output, fluctuations in $H_{int}$ with the film thickness of the back layer can be suppressed and sensor characteristics stabilized, and high recording densities can be realized.

22 Claims, 5 Drawing Sheets

SPIN-VALVE MAGNETORESISTANCE SENSOR AND THIN-FILM MAGNETIC HEAD

BACKGROUND OF THE INVENTION

1. Field of the Invention

This invention concerns a spin-valve type magnetoresistance sensor in which a free ferromagnetic layer and pinned ferromagnetic layer enclosing a nonmagnetic spacer layer on substrate, and in which the magnetization direction of the pinned ferromagnetic layer is pinned by an antiferromagnetic layer, as well as a thin film magnetic head provided with a spin-valve magnetoresistance sensor, for use in magnetic recording devices.

2. Background Information

In the past, magnetoresistance (MR) sensors have been developed with a spin-valve film structure exhibiting the giant magnetoresistance effect in order to raise the magnetic field sensitivity of reproduction magnetic heads. In general, spin-valve MR films consist of a sandwich structure in which two magnetic layers enclose a nonmagnetic spacer layer on substrate; one of these, the pinned layer (fixed ferromagnetic layer), has its magnetization fixed parallel to the signal magnetic field by the exchange coupling magnetic field with the adjacent antiferromagnetic layer, and the magnetization of the other, free layer (free ferromagnetic layer) has a single magnetic domain induced by a hard-bias method using the magnetic field of a permanent magnet, so that its magnetization rotates freely under the action of an external magnetic field. When the magnetization of the free layer rotates under the action of the external magnetic field from a magnetic recording medium or other source, the angular difference in magnetization direction arising between the two magnetic layers causes a change in the resistance of the MR film. By means of this magnetoresistive change, the data recorded in the recording medium can be detected.

On the other hand, in order to enhance the magnetic sensitivity of a spin-valve MR sensor, it is effective to reduce the film thickness of the free layer; but it is known that if the free layer thickness is reduced too much, for example so that the mean free path of conduction electrons is reduced to 30 to 50 Å or so, then the magnetoresistance change (MR ratio) declines. Recently, in order to resolve this problem, methods have been studied for raising the MR ratio by forming a back layer (or backing layer) of a nonmagnetic metal layer adjacent to the free layer on the opposite side of the nonmagnetic spacer layer so as to effectively increase the mean free path of conduction electrons, as disclosed for example in the specification of patent U.S. Pat. No. 2,744,883.

In a paper by H. Iwasaki et al titled "Spin Filter Spin Valve Heads with Ultrathin CoFe Free Layers" (IEEE, Intermag 99, BA-04 (1999)), a spin-valve film with a spin filter structure provided with a free layer comprising a CoFe thin film in contact with a highly conductive layer on the side opposite the Cu spacer layer, as well as a magnetic head using this, were proposed. It is reported that by this means, the mean free path of up-spin electrons is improved by the existence of the highly conductive layer, and moreover the mean free path between up-spin electrons and down-spin electrons is maintained, so that a high and stable MR ratio is obtained even for an extremely thin free layer of thickness 15 Å, and consequently sensor sensitivity is improved, and high recording densities can be realized.

However, when the characteristics of spin-valve films with such a spin filter structure were actually measured with the back layer thickness varied, it was found that the interlayer coupling magnetic field ($H_{int}$) acting between the free layer and the pinned layer fluctuates greatly with the back layer thickness.

FIG. 5 shows the configuration of the spin-valve films used in these measurements. On top of an underlayer consisting of a Ta (30 Å) film 2 and NiFeCr (40 Å) film 3 formed on a substrate 1 are formed a PtMn (250 Å) antiferromagnetic layer 4; a synthetic-structure pinned layer consisting of a CoFe (20 Å) film 5, Ru (8.5 Å) film 6, and CoFe (26 Å) film 7; a Cu (24 Å) nonmagnetic spacer layer 8; a free layer consisting of a CoFe (10 Å) film 9 and NiFe (20 Å) film 10; and a Cu nonmagnetic metal layer 11 as a back layer. On top of this is formed a Ta (30 Å) protective layer 12. After film formation, heat treatment is performed for 10 hours at 270° C. in a 15 kG magnetic field in vacuum, in order to render the PtMn antiferromagnetic layer 4 regular and to induce an exchange coupling with the aforementioned pinned layer.

FIG. 6 shows changes in $H_{int}$ for this spin-valve film as the thickness t of the Cu nonmagnetic metal layer 11 was varied from 0 to 40 Å. In the figure, when the Cu film thickness t was increased from 5 Å to 15 Å, $H_{int}$ decreased from 8 Oe to 2 Oe. Because the average amount of change per Angstrom is 0.6 Oe/Å, even if, for example, the back layer film thickness could be controlled with a precision of ±1 Å, the amount of change in $H_{int}$ in this error range would be as great as 1.2 Oe, indicating a large dependence on the back layer film thickness.

In particular, $H_{int}$ is an important parameter affecting the nonlinearity (asymmetry) of the sensor output; hence scattering in $H_{int}$ directly causes scattering in the sensor performance, and stability suffers. For this reason, when such a sensor is applied in a read magnetic head, scattering occurs in the magnetic transducing characteristics due to manufacturing conditions, production yields decrease, and reliability is degraded.

SUMMARY OF THE INVENTION

A spin-valve magnetoresistance sensor is disclosed. In one embodiment, the spin-valve magnetoresistance sensor is characterized by being provided with a free-side ferromagnetic layer deposited on substrate, a pinned-side ferromagnetic layer, a nonmagnetic spacer layer enclosed between both aforementioned ferromagnetic layers, an antiferromagnetic layer adjacent to the aforementioned pinned-side ferromagnetic layer and which pins said fixed-side ferromagnetic layer, and a back layer comprising at least two nonmagnetic metal layers deposited on the side opposite the aforementioned nonmagnetic spacer layer and adjacent to the aforementioned free-side ferromagnetic layer.

EXPLANATION OF SYMBOLS

Figure 1:
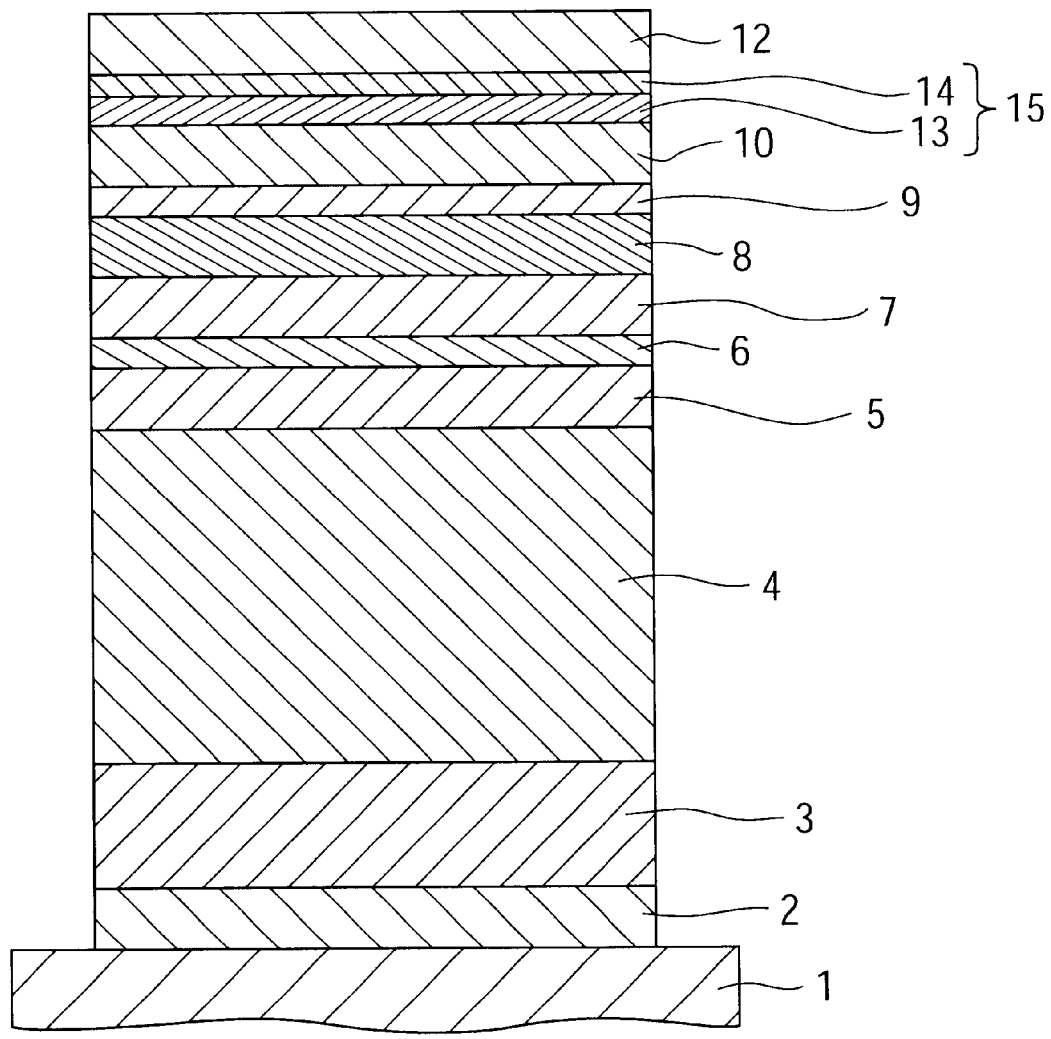
FIG. 1 is a cross-sectional diagram showing one embodiment of a spin-valve film applying this invention.

1 Substrate
2 film
3 NiFeCr film
4 Antiferromagnetic layer
5 CoFe film
6 Ru film
7 CoFe film
8 Nonmagnetic spacer film
9 CoFe film
10 NiFe film
11 Nonmagnetic metal layer
12 Protective layer
13 Cu nonmagnetic metal layer
14 Ru nonmagnetic metal layer
15 Back layer
16 Hard bias underlayer
17 Hard bias layer
18 Electrode film
19 Alumina gap film
20 Alumina insulating layer

DETAILED DESCRIPTION

The present invention was devised in light of the above-mentioned problems with the prior art. One aspect of the present invention provides a spin-valve magnetoresistance sensor with a so-called spin filter structure which enables still thinner free layer thicknesses so as to enable high read outputs with higher sensor sensitivity, while at the same time suppressing asymmetric scattering in read output and stabilizing sensor magnetic characteristics.

Another aspect of the present invention provides a thin film magnetic head which, by the provision of this spin-valve magnetoresistance sensor, can stably exhibit enhanced performance compatible with still greater recording capacities and higher recording densities in magnetic recording, yet which can be manufactured with good production yields.

In general, the interlayer coupling magnetic field ($H_{int}$) acting between a free layer and a pinned layer consists of a component which fluctuates with the film thickness of the nonmagnetic spacer layer, and a component arising from irregularities in the interface (IEEE Transactions on Magnetics, Vol. 32, No. 4, p. 3165, 1996). Of these, the fluctuations arising from the film thickness of the nonmagnetic spacer layer have the same origin as the phenomenon of fluctuation with film thickness of the exchange coupling between magnetic layers in a Co/Cu or other multilayer film, and are thought to arise as a result of quantum interference effects between conduction electron waves (Journal of Magnetism and Magnetic Materials, Vol. 93, p. 85, 1991).

Figure 5:
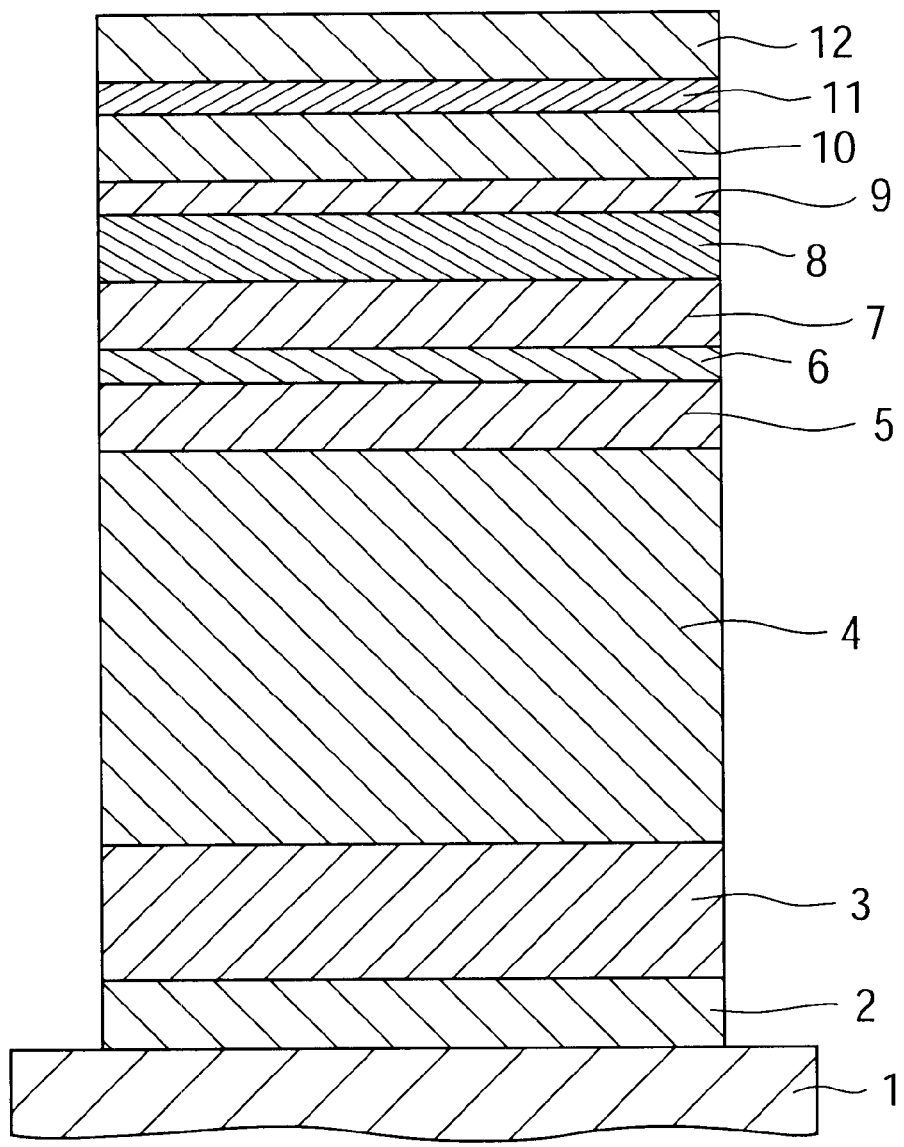
FIG. 5 is a cross-sectional diagram showing a spin filter-structure spin-valve film of the prior art.

Fluctuations with the back layer film thickness in the $H_{int}$ in spin-valve MR sensors with the above-described conventional spin filter structure of FIG. 5 are also thought to be similarly induced by quantum interference effects of electron waves. That is, conduction electrons pass from the nonmagnetic spacer layer through the free layer and through the back layer to be reflected at the interface with the Ta protective layer, and interfere with electron waves in the nonmagnetic spacer layer to create standing waves. Hence if the thickness of the back layer is changed, the state of interference with electron waves changes, and so it is expected that the exchange coupling between the free layer and pinned layer via the nonmagnetic spacer layer can be changed.

Embodiments of the present invention have been devised on the basis of these insights of the inventors of this application, and provide a spin-valve magnetoresistance sensor characterized by comprising a free-side ferromagnetic layer (free layer), fixed-side ferromagnetic layer (pinned layer), nonmagnetic spacer layer enclosed between both aforementioned ferromagnetic layers, antiferromagnetic layer adjacent to the fixed-side ferromagnetic layer for pinning said fixed-side ferromagnetic layer, and back layer consisting of at least two nonmagnetic metal layers, adjacent to the free-side ferromagnetic layer and formed on the side opposite the nonmagnetic spacer layer, all formed on substrate. Here the back layer is a nonmagnetic metal layer which acts to pass conduction electrons, while reflecting electrons at the interface with the layer in contact with its upper surface.

By thus providing a back layer consisting of two or more nonmagnetic metal layers, electron waves passing from the pinned layer through the nonmagnetic spacer layer and free layer are affected by the Fermi surfaces of the metals of different types while passing through the back layer, and so the standing wave state of the prior art is difficult to maintain. As a result, the interference state of electron waves becomes difficult to change through the back layer thickness, and large fluctuations in $H_{int}$ can be effectively suppressed.

In one embodiment, Cu in particular has a high electrical conductivity, and so is well-suited as the back layer in order to increase the mean free path in the free layer; hence it is desirable that at least one of the nonmagnetic metal layers of the aforementioned back layer be of Cu.

On the other hand, because Cu has a high electrical conductivity, the probability that electrons reflected at the interface with the Ta protective layer will return to the nonmagnetic spacer layer side is high, and so there is concern that the back layer film thickness will affect the interference state of electron waves. Hence in another embodiment, it is expedient to provide the aforementioned back layer and Cu nonmagnetic metal layer adjacent to the free layer.

In one embodiment, the aforementioned back layer can be formed from a two-layer structure of Cu and Ru. In particular, Ru has a lower electrical conductivity than Cu, and so conduction electrons are easily scattered. Hence if the aforementioned back layer is deposited from the free-layer side in the order Cu/Ru, conduction electrons passing from the free layer through the Cu layer to the Ru layer are easily scattered, and so the probability that they will return to the nonmagnetic spacer layer in the coherent state is low, and the effect of fluctuations in the back layer film thickness on the state of interference of electron waves is small.

Also, Ru has a relatively high melting point, and so has the feature of acting to suppress interdiffusion at the interfaces in multilayer structures where heat treatment is required, as in spin-valve sensors. On the other hand, there is the concern that diffusion will occur between Cu and the NiFe comprising the free layer during heat treatment; hence if an Ru layer is inserted as a diffusion barrier layer between the free layer and the Cu layer of the aforementioned back layer, degradation of sensor characteristics due to heat treatment can be prevented.

Further, if the aforementioned back layer is formed from a three-layer Ru/Cu/Ru layer structure, both the action of suppressing fluctuations in $H_{int}$ described above, and the action of preventing degradation of performance by heat treatment are obtained simultaneously, for greater expedience.

Also, if the film thickness of the nonmagnetic metal layer consisting of Cu is in the range 5 to 20 Å, the mean free path of conduction electrons is increased and the MR ratio can be improved, as described below, and moreover the influence of the shunt effect acting to reduce the MR ratio is small, for greater expedience.

Various materials other than the above-described Cu and Ru can be used in the aforementioned back layer; specifically, it is expedient if the aforementioned back layer comprises two or more layers, combining a nonmagnetic metal layer consisting of one, or of two or more, elements selected from the group Cu, Ag, Au with relatively high electrical conductivity, and a nonmagnetic metal layer consisting of one, or of two or more, elements selected from the group Ru, Re, Os, Ir, Rh, W, Nb, Mo, Cr, V, Pd, Pt with lower electrical conductivity.

As a separate aspect of this invention, a thin film magnetic head equipped with the above-described spin-valve magnetoresistance sensor is provided. Because fluctuations in $H_{int}$ are small, there is little asymmetry in the reproduction output, and at the same time high reproduction output is obtained.

Below, preferred embodiments of this invention are explained in detail, referring to the attached drawings.

FIG. 1 shows a cross-sectional view of the configuration of a spin-valve MR sensor to which the so-called spin filter structure of this invention is applied. In this spin-valve MR sensor, on a substrate 1 of glass, silicon, $Al_2O_3$—TiC or other ceramic material, or similar, an underlayer is formed with a two-layer structure consisting of a first underlayer film of Ta 2 and a second underlayer film of NiFeCr 3, in order to improve the overall crystal orientation of films formed on top of these; on these is formed the spin-valve MR film. This MR film is what is called a synthetic spin-valve film, with a three-layer structure pinned layer formed in layers on top of an antiferromagnetic layer 4. The three-layer structure consists of a CoFe ferromagnetic film 5, a Ru nonmagnetic film 6, and a CoFe ferromagnetic film 7. The antiferromagnetic layer 4 consists of a PtMn film formed on the aforementioned underlayer. The two aforementioned ferromagnetic films enclose the nonmagnetic film, integrated by a strong antiparallel magnetic coupling, as a result of which the exchange coupling with the antiferromagnetic layer 4 is strengthened and the sensor operation is stabilized, and moreover the static magnetic field from the pinned layer to the free layer is diminished, so that the asymmetry of the read output is alleviated.

On the aforementioned pinned layer, a nonmagnetic spacer layer 8 of Cu is formed, and on top of this is formed a free layer with a two-layer structure consisting of a CoFe layer 9 and an NiFe layer 10. In this embodiment, in order to obtain a high magnetic field sensitivity, the aforementioned free layer is formed to a smaller thickness than in conventional spin-valve films. In order to avoid reductions in the MR ratio due to the reduced thickness of the free layer, on top of the aforementioned free layer is formed a back layer 15 with a two-layer structure consisting of a nonmagnetic metal layer 13 of Cu and a nonmagnetic metal layer 14 of Ru, in order to increase the mean free path of conduction electrons. On the very top is formed a protective layer 12 of, for example, Ta, in order to prevent the oxidation which is known to occur in subsequent manufacturing processes and during use.

By thus combining Cu and Ru to provide a back layer with a two-layer structure, not only can the mean free path of the free layer be extended, but the probability that conduction electrons reflected at the interface with the Ta protective layer will be returned to the nonmagnetic spacer layer 8 by scattering is reduced. Hence a high read output is obtained, and at the same time large fluctuations in $H_{int}$ due to fluctuations in the film thickness of the back layer during manufacturing processes are suppressed, to stabilize the sensor characteristics.

By subjecting the aforementioned MR film to prescribed heat processing in vacuum in a magnetic field after deposition, the antiferromagnetic layer 4 is made regular, and the exchange coupling imparts a uniaxial anisotropy to the aforementioned pinned layer and fixes the direction of its magnetization. At this time the Cu of the nonmagnetic metal layer 13 may diffuse into the thin free layer of NiFe 10, possibly degrading sensor characteristics. Hence in a separate embodiment, the aforementioned back layer is formed with a Ru/Cu/Ru three-layer structure. The Ru film in contact with the NiFe film 10 functions as a Cu diffusion barrier layer during the above heat treatment after film deposition, so that degradation of sensor characteristics is prevented.

In addition to the Cu and Ru discussed above, various other nonmagnetic metal materials can be used in the back layer 15. For example, by selecting a layered film of two or more layers which combines a nonmagnetic metal layer consisting of one from among Ag and Au, which like Cu have relatively high electrical conductivity, or consisting of two or more of these including Cu, and a nonmagnetic metal layer consisting of one from among Re, Os, Ir, Rh, W, Nb, Mo, Cr, V, Pd or Pt, which like Ru have lower electrical conductivity, or consisting of two or more of these including Ru, the aforementioned back layer can be formed, and as a result effects can be obtained similar to those described above in connection with FIG. 1.

DC magnetron sputtering was used to actually form the spin-valve MR film of FIG. 1, with composition Ta (30 Å)/NiFeCr (40 Å)/PtMn (250 Å)/CoFe (20 Å)/Ru (8.5 Å)/CoFe (26 Å)/Cu (24 Å)/CoFe (10 Å)/NiFe (20 Å)/Cu/Ru (5 Å)/Ta (30 Å) on substrate, and changes in $H_{int}$ with the film thickness t of the Cu layer of the back layer 15 were measured. This MR film was heat-treated for 10 hours at 270° C. in vacuum in a 15 kG magnetic field after deposition.

Figure 2:
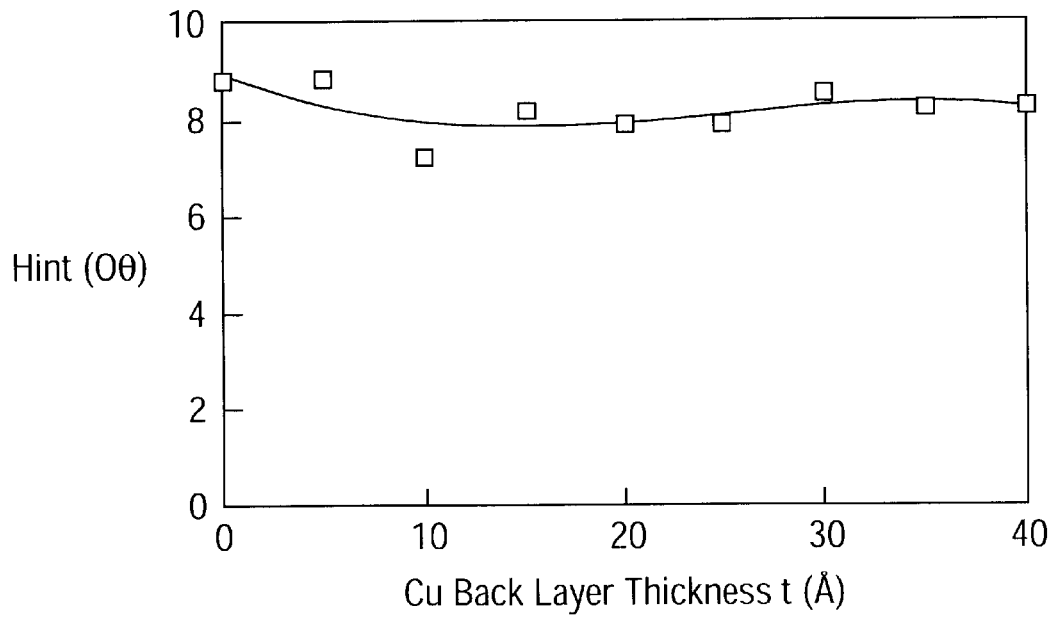
FIG. 2 is a graph showing changes in $H_{int}$ with the thickness of the Cu layer in the back layer in the spin-valve film of FIG. 1.
Figure 6:
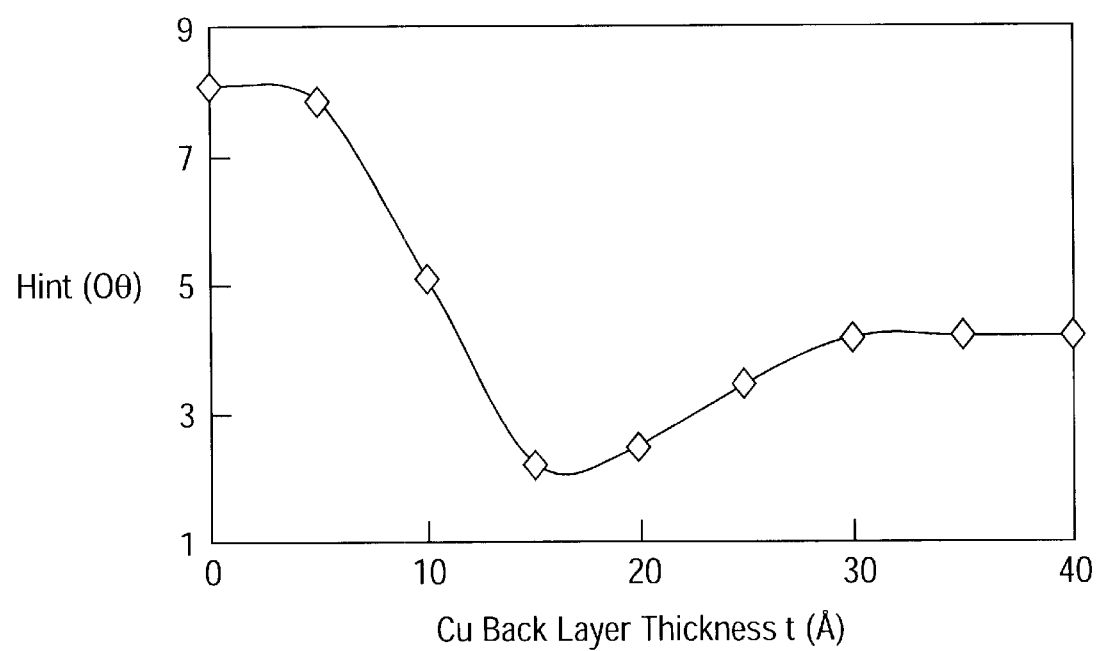
FIG. 6 is a graph showing changes in Hi with the thickness of the Cu layer in the back layer of the spin-valve film of FIG. 5.

On varying the thickness t of the aforementioned Cu layer in the range from 0 Å to 40 Å, the results shown in FIG. 2 were obtained. As is clear from the figure, $H_{int}$ is essentially constant even when the thickness t of the Cu layer is varied. On comparing this with the results of measurements for an example of a spin-valve MR film of the prior art, shown in FIG. 6, it is clear that the back layer of a Cu/Ru nonmagnetic metal material layer structure of this invention is highly effective in suppressing fluctuations in $H_{int}$.

Figure 3:
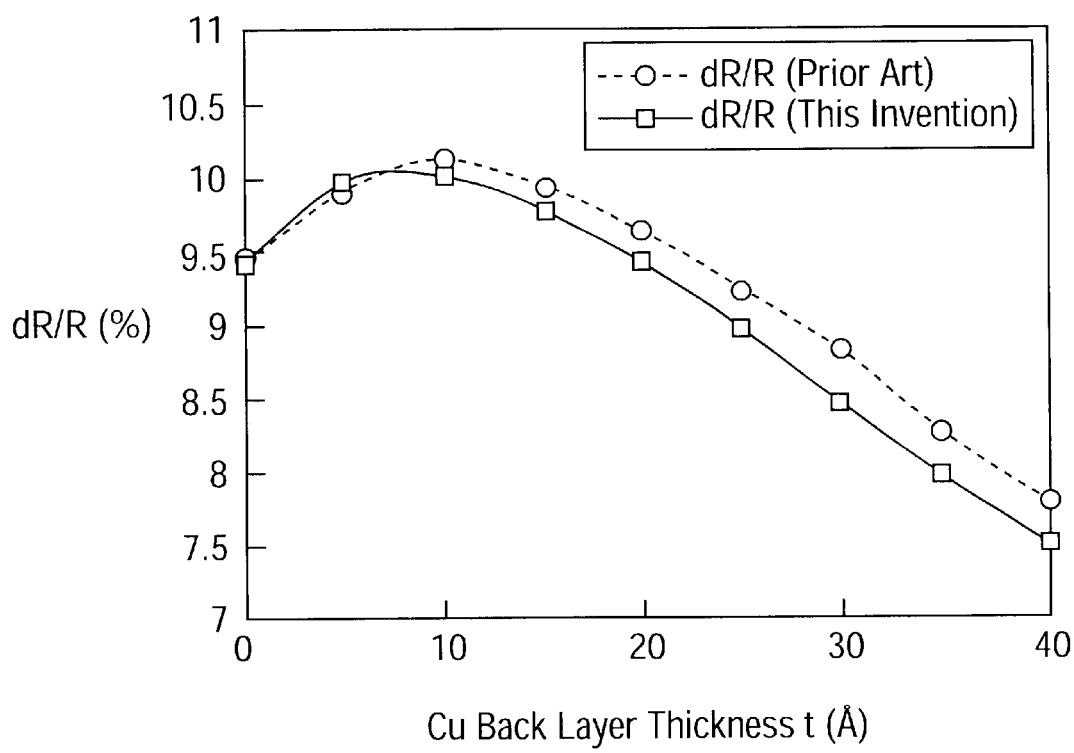
FIG. 3 is a graph showing changes in the MR ratio with the Cu layer thickness in the back layer of the spin-valve films of FIG. 1 and FIG. 5.

Next, the magnetoresistance effect (MR effect) for thickness t of the Cu layer of the back layer was measured, as the change in dR/R value, for a spin-valve MR film of this embodiment and for an example of a spin-valve MR film of the prior art in relation to FIG. 5, both using the four-probe method after heat treatment. The measurement results appear in FIG. 3.

From the figure, it is seen that in order to extend the mean free path and improve the MR ratio, the Cu layer thickness t must be at least 5 Å, and that if the film thickness t is 20 Å or greater, the shunt effect of the sense current will cause the MR ratio to be decreased more than necessary. Hence in order to obtain the magnetoresistance effect desired for a spin-valve MR sensor—that is, in order to obtain a high read output—it is desirable that the thickness t of the Cu layer comprising the back layer be 5 Å or greater, and 20 Å or less.

Figure 4:
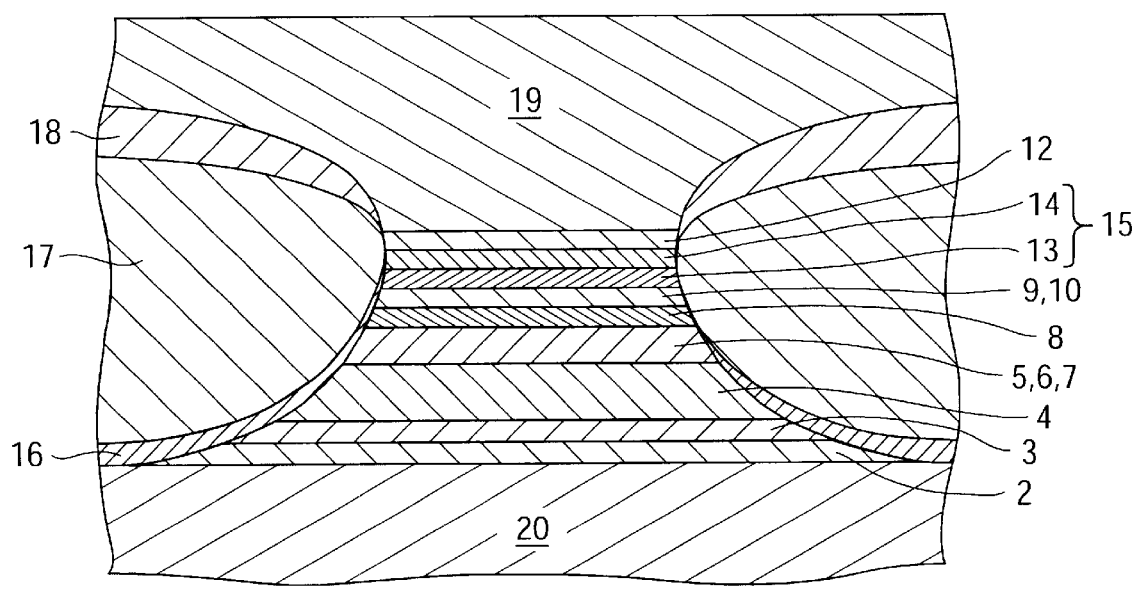
FIG. 4 is a cross-sectional diagram showing one embodiment of a spin-valve MR sensor of this invention.

Both sides of the spin-valve MR film of FIG. 1 are removed by etching so that the aforementioned free layer has the desired track width, and on both sides, a hard bias underlayer 16 and hard bias film 17 are formed so as to induce a single domain in the free layer, as shown in FIG. 4. On the hard bias film 17 is formed a pair of electrode films 18 to pass a sense current; this entire layered structure is covered with an alumina gap film 19, to complete the spin-valve MR sensor of this invention.

This spin-valve MR sensor is created on top of a lower magnetic shield layer and alumina insulating layer 20 formed on the substrate in FIG. 4; on top of it are formed an upper shield layer, a write head, read and write signal terminals and other components, all of which is covered by an alumina protective layer. This is followed by machining into a slider from the wafer, and addition of a suspension and leader line and assembly, to complete the compound thin film magnetic head of this invention.

A thin film magnetic head was assembled using a spin-valve MR sensor comprising the layers Ta (30 Å)/NiFeCr (40 Å)/PtMn (250 Å)/CoFe (20 Å)/Ru (8.5 Å)/CoFe (26 Å)/Cu (24 Å)/CoFe (10A)/NiFe (20 Å)/Cu (10A)/Ru (5 Å)/Ta (30 Å), fabricated by a method similar to that of the embodiment described above, and heat-treated at 270° C. for 10 hours in vacuum in a 15 kG magnetic field, and the read/write characteristics of the head were measured using a read-write tester. As an example for comparison, a thin film magnetic head was also fabricated with exactly the same composition, except for the fact that the back layer consisted only of a Cu layer, and read/write characteristics were similarly measured. The measurement results appear in Table 1 below.

TABLE 1

| | Back layer structure | Read output per unit track width | Output asymmetry | Standard deviation of asymmetry |
|---|---|---|---|---|
| This invention | Cu(10Å)/Ru(5Å) | 3.05 mV/μm | 2.40% | 7.29% |
| Example for comparison | Cu(10Å) | 2.97 mV/μm | 4.45% | 10.81% |

Read output with extremely high sensitivity was similarly obtained for both this invention and the example for comparison; but the read output asymmetry, and its standard deviation, were both clearly smaller for this invention than for the example for comparison. In particular, the smaller standard deviation of the asymmetry is attributed to the fact that the back layer with the Cu/Ru layer structure results in suppression of fluctuations in $H_{int}$. Hence by means of the magnetic head of this invention, it is possible to greatly improve scattering in the magnetic transducing characteristics and production yields.

As is clear from the above explanation, the spin-valve magnetoresistance sensor of this invention has a thinner free layer and higher magnetic sensitivity, and not only can a higher read output be obtained, but by forming a back layer from two or more nonmagnetic metal layers, fluctuations in $H_{int}$ due to fluctuations in the film thickness can be effectively suppressed. Consequently scattering in the asymmetry of the read output can be suppressed, the magnetic characteristics of the sensor can be stabilized, and high recording densities in magnetic recording can be realized. Further, a thin film magnetic head providing high performance and stability, and enabling larger-capacity, higher-density magnetic recording, can be manufactured with good production yields.

What is claimed is:

1. A spin-valve magnetoresistance sensor, comprising:
   a free-side ferromagnetic layer;
   a pinned-side ferromagnetic layer;
   a nonmagnetic spacer layer disposed between the free-side ferromagnetic layer and the pinned-side ferromagnetic layer;
   an antiferromagnetic layer adjacent to the pinned-side ferromagnetic layer, the pinned-side ferromagnetic layer pinned by the antiferromagnetic layer;
   a back layer, consisting of two or more nonmagnetic metal layers, disposed directly on the free-side ferromagnetic layer, the free-side ferromagnetic layer being disposed between the back layer and the nonmagnetic spacer layer; and
   a protective layer that covers the back layer.

2. The spin-valve magnetoresistance sensor of claim 1, wherein at least one of the nonmagnetic metal layers of the back layer comprises Cu.

3. The spin-valve magnetoresistance sensor of claim 2, wherein the back layer includes a two-layer structure of Cu and Ru.

4. The spin-valve magnetoresistance sensor of claim 2, wherein the back layer includes a three-layer structure of Ru/Cu/Ru.

5. The spin-valve magnetoresistance sensor of claim 1, wherein one of the nonmagnetic metal layers comprises a Cu layer disposed directly on the free-side ferromagnetic layer.

6. The spin-valve magnetoresistance sensor of claim 5, wherein the Cu layer has a film thickness of from 5 to 20 angstroms.

7. The spin-valve magnetoresistance sensor of claim 1, wherein one of the nonmagnetic metal layers comprises a layer including at least one of the elements selected from a group consisting of Ru, Re, Os, Ir, Rh, W, Nb, Mo, Cr, V, Pd, and Pt.

8. The spin-valve magnetoresistance sensor of claim 1, wherein the spin-valve magnetoresistance sensor is included in a thin film magnetic head.

9. A spin-valve magnetoresistance sensor comprising:
   a free-side ferromagnetic structure;
   a fixed-side ferromagnetic structure;
   a nonmagnetic spacer layer that separates the free-side and fixed-side ferromagnetic structures;
   an antiferromagnetic layer disposed adjacent the fixed-side ferromagnetic structure to pin the fixed-side ferromagnetic structure; and
   a back layer nonmagnetic metal structure consisting of two or more nonmagnetic metal layers disposed directly on the free-side ferromagnetic structure; and
   a protective layer that covers the back layer.

10. The spin-valve magnetoresistance sensor of claim 9 wherein the two or more nonmagnetic metal layers comprise a first layer of Cu and a second layer of Ru.

11. The spin-valve magnetoresistance sensor of claim 9 wherein the two or more nonmagnetic metal layers comprise a first layer of Cu, a second layer of Ru, and a third layer of Cu.

12. The spin-valve magnetoresistance sensor of claim 9 wherein at least one of the two or more nonmagnetic metal layers comprise a first layer of Cu.

13. The spin-valve magnetoresistance sensor of either claims 10, 11, or 12 wherein the first layer of Cu has a thickness in a range of 5 to 20 angstroms.

14. The spin-valve magnetoresistance sensor of claim 9 wherein the two or more nonmagnetic metal layers comprise a first layer of one or more elements selected from the group consisting of Cu, Ag, and Au, and a second layer of one or more elements selected from the group consisting of Ru, Re, Os, Ir, Rh, W, Nb, Mo, Cr, V, Pd, and Pt.

15. The spin-valve magnetoresistance sensor of claim 9 wherein the two or more nonmagnetic metal layers comprise a first layer of Ru, a second layer of Cu, and a third layer of Ru.

16. A thin-film magnetic head comprising:
   a substrate;
   an insulating layer on the substrate;
   a spin-valve magnetoresistance sensor disposed on the insulating layer, the spin-valve magnetoresistance sensor including:
      a free-side ferromagnetic structure;
      a fixed-side ferromagnetic structure;
      a nonmagnetic spacer layer that separates the free-side and fixed-side ferromagnetic structures;
      an antiferromagnetic layer disposed adjacent the fixed-side ferromagnetic structure to pin the fixed-side ferromagnetic structure; and
      a back layer structure consisting of two or more nonmagnetic metal layers disposed directly on the free-side ferromagnetic structure.

17. The thin-film magnetic head of claim 16 wherein the two or more nonmagnetic metal layers comprise a first layer of Cu and a second layer of Ru.

18. The thin-film magnetic head of claim 16 wherein the two or more nonmagnetic metal layers comprise a first layer of Cu, a second layer of Ru, and a third layer of Cu.

19. The thin-film magnetic head of claim 16 wherein at least one of the two or more nonmagnetic metal layers comprise a first layer of Cu.

20. The thin-film magnetic head of either claims 17, 18, or 19 wherein the first layer of Cu has a thickness in a range of 5 to 20 angstroms.

21. The spin-valve magnetoresistance sensor of claim 16 wherein the two or more nonmagnetic metal layers comprise a first layer of one or more elements selected from the group consisting of Cu, Ag, and Au, and a second layer of one or more elements selected from the group consisting of Ru, Re, Os, Ir, Rh, W, Nb, Mo, Cr, V, Pd, and Pt.

22. The spin-valve magnetoresistance sensor of claim 16 wherein the two or more nonmagnetic metal layers comprise a first layer of Ru, a second layer of Cu, and a third layer of Ru.

* * * * *